3,076,759
WELL FLUID AND ADDITIVES THEREFOR
Orien W. Van Dyke and Leroy L. Carney, Houston, Tex., assignors to Magnet Cove Barium Corporation, Houston, Tex.
No Drawing. Filed Aug. 15, 1960, Ser. No. 49,421
10 Claims. (Cl. 252—8.5)

This invention relates to improved well fluids containing chromium magnesium complexes of oxidized lignosulfonates. In one of its aspects it relates to improved additives for drilling fluids. In another of its aspects it relates to drilling fluids having improved physical properties, and in other aspects, it relates to well fluids having improved flow properties. In still another aspect, it relates to a process for preparing an improved compound of iron-free water-soluble chromium complexes of oxidized lignosulfonates in which magnesium sulfate is incorporated to improve its effectiveness in treating well fluids.

The most commonly used drilling fluids are aqueous dispersions of clay such as bentonite, illite, kaolinite, and other similar materials. These slurries frequently include caustic soda, lime, and a dispersant to form a lime-base fluid, or calcium sulfate, caustic soda, and a dispersant to form a gyp-type fluid. Sea water may be used as a liquid phase of a well fluid, and any or all of the above-mentioned materials may be used in preparing sea water muds. These well fluids or drilling muds so-prepared are often weighted with a finely-ground mineral which has a high specific gravity and is relatively inert. Ground barite and ground iron oxide are used commercially in making high weight muds which are often required to overcome high pressures that are encountered in the formations penetrated during the drilling of oil and gas wells. High weight drilling fluids must be controlled within relatively narrow limits so as to allow trouble-free drilling of deep, high-pressure wells. High weight drilling fluids are costly, and the deep wells in which they are used are very expensive. Because of this and also because of the exacting control that is required, improved chemicals are needed for preparing and drilling well fluids.

A well fluid for use in rotary drilling must have sufficient viscosity that it easily carries rock chips and materials loosened by the drill bit out to the surface of the ground by flow of the fluid and it must be thixotropic so that when drilling is stopped at any time, the fluid will gel and prevent chips from settling around the drill bit.

The apparent viscosity or resistance to flow of plastic fluids, such as drilling muds, is a resultant of two properties, plastic viscosity and yield point. These two properties are independent of each other and each represents a different source of resistance to flow. Plastic viscosity is a property related to the concentration of solids in the fluid, whereas yield point is a property related to the interparticle forces. Gel strength, on the other hand, is a property that denotes the thixotropy of mud at rest. The yield point, gel strength and in turn the apparent viscosity of mud commonly are controlled by chemical treatment with materials such as complex phosphates, alkalies, mined lignites, plant tannins, and modified lignosulfonates.

A number of physical properties of well fluids are measured and controlled in addition to weight, viscosity, and yield point, which are mentioned above. An important property of drilling fluid is its ability to seal porous formations penetrated. This is measured by a standard test commonly referred to as water loss, fluid loss, or wall-building properties. The water loss of a well fluid is influenced by the type of solids and the chemical treatment of the solids in the fluid. Bentonite is often added to improve wall-building properties of the mud. A number of organic colloids such as gelatinized starch, carboxymethyl cellulose, and sodium polyacrylates are used to lower water loss. Treating chemicals often referred to as organic dispersants also are effective in lowering the water loss.

It has been found that certain modified lignosulfonates prepared from spent sulfite liquors also may be used to control fluid loss, but when used to accomplish this result, the modified lignosulfonates must be used in excess of the quantity required to reduce the yield point of a well fluid to a minimum, and the excess lignosulfonate has the effect of increasing the yield point, frequently to a very undesirable degree.

Since drilling fluids used in the rotary drilling of wells are circulated into and out of the bore continuously during the drilling operation, they undergo changes due to loss of water, dispersion of formation cuttings in the fluid, contamination with salts from formations penetrated and other causes. In order to perform the desired function, it is of utmost importance that the viscosity, yield point and gel strength of the drilling fluid be maintained within reasonable limits. The modified lignosulfonates when used in quantity sufficient to decrease water loss frequently result in a fluid of very undesirable rheological properties.

This invention is based upon a discovery that the undesirable rheological properties imparted to well fluids by quantities of certain particular modified lignosulfonates which are substantially iron-free, water soluble, chromium complexes of oxidized lignosulfonates may be corrected by incorporating relatively small amounts of magnesium sulfate. This correction of rheological properties can be obtained in many types of drilling fluids such as gypsum muds, lime muds and fresh water muds.

A principal object of this invention is to provide improved chemicals for treatment of well fluids.

Another object of this invention is to provide an improved well fluid wherein the yield point increasing effect of an amount of substantially iron-free, water-soluble, chromium complex of oxidized lignosulfonate required to reduce fluid loss is corrected by the presence of magnesium sulfate in the modified lignosulfonate compound.

Another object of this invention is to provide a novel method for treating drilling fluid to control yield point and water loss by use of an improved concentrated material containing modified lignosulfonates.

Another object is to provide improved concentrated material for mixing with drilling fluid to control yield point and water loss.

Another object is to provide a method for the preparation of a modified lignosulfonate concentrate which may be added in high proportions to a drilling fluid without undesirable increase in yield point of the fluid.

Still another object is to provide a concentrated material of the type recited above which is especially effective in gypsum muds, lime muds and sea water muds.

Other objects and advantages are inherent and will become apparent upon consideration of the specification and claims.

In accordance with one aspect of this invention, there is provided a novel process for the production of a concentrated material for addition to well fluids. This concentrated material may be a solution or it may be a dry powder. The raw material for this process is spent sulfite liquor resulting from the sulfite process for manufacturing paper from wood and usually containing from 10 to 50% solids.

Several modifications of the sulfite paper making process are known, but the process may be considered basically as one comprising cooking wood chips in a liquor made by dissolving limestone in sulfurous acid. There are modifications which involve the use of ammonium compounds, but the cooking liquor in either case dissolves the lignin contained in the wood without attacking cellulose appreciably, so that the cellulose contained in the wood can be obtained in relatively pure form for use as paper pulp. After cellulose is separated, the spent or waste sulfite liquors contain complex mixtures of organic compounds extracted when the wood is partially dissolved by the cooking liquor.

Solids contained in waste sulfite liquor usually are made up of about ten to fifteen percent of incompletely hydrolyzed carbohydrates, fifteen to twenty percent wood sugars, about sixty percent lignosulfonic acids and a total of about ten percent calcium sulfate, calcium sulfite, acids and other materials. The solution drained from the digestor is quite acid, usually having a pH of about 2.0. The pH increases when the liquor is concentrated by evaporation, due to evolution of sulfur dioxide and other acidic materials from the liquor until a final pH of approximately 4.0 is reached. The spent sulfite liquors are waste material which pose a very severe disposal problem, and being very plentiful, they offer a relatively cheap source of lignosulfonate raw material to be employed in the process for making the well fluid additive disclosed in this invention.

A major proportion of the solids contained in sulfite liquors is made up of water soluble lignosulfonic acids as shown above and this is true of sulfite liquors from all the various modifications of the sulfite paper making process, although these liquors will differ somewhat from each other because of differences in the woods used in pulping operations, variations in chemical treatment and the time, temperature and pressure in the digestor.

It has been believed that because of the high proportion of lignosulfonic acids present in these waste liquors, that the liquors themselves might be used to thin well fluids by preventing flocculation of clay in the presence of relatively high concentrations of calcium ions. The increasing use of muds containing gypsum and lime in fairly high concentrations has increased the need for such a dispersant and has led to attempts to apply lignosulfonic acids from sulfite liquors to this use.

Whole spent sulfite liquors are ineffective for treating well fluids and cause copious foaming. It is believed that the wood sugars contained in the liquors strongly contribute to the foam-forming effect. In the past, it has been thought necessary to desugar the spent liquors before attempting to treat them to produce a material suitable for treating well fluids. The term "spent sulfite liquors" is used in this application to designate sulfite liquors which have or have not been desugared and is intended to include spent liquor, as withdrawn from a digestor or after concentration by evaporation, and to include solutions made by redissolving a solid residue made by drying the spent liquor.

In accordance with the present invention, spent sulfite liquor, either as withdrawn from the digestor and containing approximately 10% solids, or in a more concentrated solution which may contain up to 50% solids, or in a dried and redissolved form, is treated with a water soluble chromium salt of an alkali metal and is then acidified with a strong acid, preferably a material selected from the group consisting of sulfuric, hydrochloric, and nitric acids and mixtures thereof in quantity to reduce the pH of the mixture to a value not more than 2.0. The resulting mixture is then held for a reaction time, usually about two hours or sufficiently long so that the reaction between the chromium salt and materials contained in the sulfite liquor is substantially complete.

After the reaction is substantially complete, the mixture is treated by addition of caustic soda, or other alkali in a quantity sufficient to raise the pH to a point in the range from 2.5 to 4.0. In accordance with this invention, magnesium sulfate may be added to the sulfite liquor before the chromium salt is added, or added with the chromium salt prior to oxidation under acid conditions and chromium complex formation, or the magnesium sulfate may be added after the chromium reaction is complete to produce a concentrate for treating well fluids. When added with the chromium salt before reaction, the resulting concentrated product has slightly improved yield point reducing power; and when added after the reaction is complete, the resulting product has improved fluid loss reducing power. The point of addition of magnesium sulfate therefore will usually be determined by the desirability of maximum controlling effect on one or the other of these properties.

The resulting solution containing the modified lignosulfonate and magnesium sulfate can be utilized directly as a well fluid treating product, or preferably it may be dried by one of the well known drying methods such as spray-drying or drum-drying to produce a dry product. The dry product is stable, non-caking and free-flowing when packaged, stored and transported in conventional multi-wall paper bags. It is readily useable without additional processing and affords a well operator a well fluid treating chemical which may be added to the well fluid in the field and easily dissolved therein.

The dry product possesses the characteristic of ready water solubility and it is useful for treating various well drilling fluids, including those containing lime or gypsum, to control their flow properties without troublesome foaming. It can be added in quantities sufficient to reduce water loss without danger of increasing the yield point to an undesirable extent. It can be produced at relatively low cost and involves no substantial waste, either of the spent sulfite liquor from which it is made, or of salts, acid and caustic used in treatment of the sulfite liquor.

The total solids content of the spent sulfite liquor used for preparation of the chromium complex should be in the range of from 10 to 50 percent, and is preferably about 30 to 40 percent, since the liquors are rather viscous and difficult to mix well when the solids content is much above 40 percent.

There are a number of commercial forms of chemicals used in preparing the modified lignosulfonate herein described. As a matter of definition, the magnesium sulfate herein referred to is the commercial form epsom salts having a formula $MgSO_4 \cdot 7H_2O$. The sodium dichromate referred to is the dihydrate commercial form having a formula of $Na_2Cr_2O_7 \cdot 2H_2O$. Sulfuric acid and caustic soda used in the preparation of the compounds described are commercial forms; however, the amounts referred to are on a dry solids basis. Spent sulfite liquor is commercially available from numerous paper-making operations as a by-product. Due to the differences in wood, processing conditions and the actual variations in the process, each spent sulfite liquor is slightly different. As referred to herein spent sulfite liquor includes the various products that are available, even though they may be referred to as a calcium-base, ammonia-base, or soda-base liquor. All of these are suitable for the process described, although to those skilled in the art, each may suggest minor variations in the process. It is well known that where calcium liquors are used, the addition of the sulfate ion will cause the precipitation of calcium sulfate. It is usual practice to allow the calcium sulfate to settle out, or it may be removed by centrifuging or filtration. If ammonia- or soda-base liquor is used, there is no precipitate formed. For the purposes of the description contained herein, when calcium liquor is used, most of the calcium sulfate formed is removed in processing; however, to be operative, the process does not require its removal if the end use of the product produced is in muds containing calcium sulfate.

A water-soluble chromium salt of an alkali metal is added to the spent sulfite liquor and thoroughly mixed therewith. The pH of the resulting mixture is then lowered by adding thereto a strong acid, preferably selected from the group consisting of sulfuric, hydrochloric and nitric acids, and still more preferable, sulfuric acid may be added in quantity to lower the pH of the mixture to not more than 2.0 or preferably about 1.3. The resulting mixture is then held for a period of time sufficient to allow the oxidation reduction reaction between chromium and sulfite liquor solids to go substantially to completion and the pH of the resulting mixture is then raised by addition of a material selected from the group consisting of caustic soda, potassium hydroxide, and lithium hydroxide in a quantity sufficient to raise the pH to a point in the range of from 2.5 to 4.0. At a pH in the range as described above, the resulting product has the ability to perform its functions properly, remains stable, and can be stored for further processing, such as drying.

In carrying out this invention using sodium dichromate ($Na_2Cr_2O_7 \cdot 2H_2O$), it has been found that the sodium dichromate may be used in proportions varying from about 5 to 12 percent of the total weight of solids contained in the solution with satisfactory results. Use of percentages of sodium dichromate below 5 percent of the total solids results in decreased effectiveness of the product, and at quantities of sodium dichromate below about 4 percent of the total solids, the modifying effect on the spent sulfite liquor is so diminished that the product is relatively ineffective for treating well fluids. While quantities of sodium dichromate above 8 percent and up to 12 percent of the total solids appear to give equally good results, there is substantially no improvement in results with increase of sodium dichromate within this range and any improvement in results is scarcely sufficient to offset the increased cost of sodium dichromate used. Therefore, sodium dichromate preferably is used in quantity amounting to about 9 percent of the total solids contained in the spent sulfite liquor. If the quantity of sodium dichromate is increased to 14 percent or more of the total weight of dry solids in the liquor, there is danger of forming a gelled product which may be inoperative for controlling the yield point of well fluids.

Other salts of chromium which have been found satisfactory are sodium chromate and potassium dichromate. However, sodium dichromate is preferred because of the superior performance of products made by its use.

The magnesium sulfate used in forming the product may be introduced before or with the chromium salt or, if preferred, may be added during or after the oxidation reaction. There is little difference noticeable in the products made by adding the magnesium sulfate at different stages of operation, although addition before or with the chromium salt seems to improve the yield point lowering power of the product slightly and addition after the oxidation is complete improves the water loss reducing power of the product. The differences in the product, however, are not very marked and it may be taken as a general rule that the magnesium sulfate may be added at either of these stages.

The chromium salt should be mixed thoroughly with the spent sulfite liquor before addition of acid. This is especially true when the sulfite liquor is rather viscous as frequently will be found to be the case when the total solid content thereof is 40 percent or more. Failure to mix the chromium salt thoroughly in the liquor before acid is added may result in a rapid oxidation-reduction reaction occurring due to a localized excess of chromium salt; and such localized excess of chromium salt may result in the formation of products which are inoperative for the intended use. The chromium salts may be added either in crystalline form or as a solution, as desired. Addition of the chromium salt increases the pH of the spent sulfite liquor from an initial pH of approximately 4.0 to a final pH of about 5.5 to 7.0.

Sufficient acid, preferably sulfuric acid, is then added to bring the pH down to not more than 2.0 and preferably down to about 1.3. It has been found that acids selected from the group consisting of sulfuric, hydrochloric, and nitric are all operable for this purpose, although sulfuric is preferred because of its efficient operation and because of its low price and ready availability.

Sulfuric acid may be added to reduce the pH as low as 0.5 if desired, and this has been found to be quite effective. The reaction is satisfactorily operable up to a pH of 2.0 but above pH 2.0, the effectiveness has been found to decrease rapidly.

After addition of acid, no long reaction time is necessary; holding for one or two hours has been found sufficient to permit the reaction to go substantially to completion. Heat or catalysts are not required to either initiate or sustain the oxidation-reduction reaction. When the chromium salt is added to the spent sulfite liquor at room temperature, a rise in the temperature of about 10 degrees F. or so will occur. If the liquor is sufficiently viscous that there is some difficulty in getting the chromium salt dissolved and thoroughly mixed therewith, mild heat to reduce the viscosity of the solution may be used, but such heating ordinarily is not necessary, especially when the solids content of the liquor is not more than 40 percent. Upon acidification, another rise in temperature will occur. This rise is usually about 20 degrees F.

During the reaction period, there is a gradual rise in pH of the liquor of about 0.5 unit. At the end of the reaction time, raising the pH of the liquor can be accomplished satisfactorily by the addition of sodium hydroxide, or similar base, which will neutralize the acid. Experience has shown that approximately 3 percent of sodium hydroxide is required to raise the pH of the solution to approximately 3.0. The quantity used may be varied somewhat, if desired, to give pH values anywhere in the range from 2.5 to 4.0, as these have been found to be satisfactory. A pH of about 3.0 is a good optimum value.

After the pH of the solution has been raised in this manner, the resulting product appears to be quite stable. A solution prepared in this manner has been aged for several weeks without altering its characteristics as a well fluid additive. It has also been found that the solution resulting from the process described above may be dried by any of the well known drying processes, such as spray-drying or drum-drying, to give a water soluble concentrate which is as effective as the original solution containing an equivalent weight of solids.

Specifically, it is preferred to add the magnesium sulfate in quantity equivalent to from 1 to 2 percent of the weight of solids contained in the spent sulfite liquor and then add sodium dichromate in quantity equivalent to about 9 percent of the weight of solids, thoroughly dissolving and mixing the same in the liquor, and then adding sulfuric acid with stirring until the pH of the mixture drops to about 1.3. The mixture is then held until the reaction has gone substantially to completion which should occur within a holding period of about two hours and the pH is then raised to about 3.0 by addition of a suitable base and the product is spray dried.

It is believed that the results obtained from the system described in this invention can be partially explained from the following theory of chemical action. The dichromate-acid system accomplishes two results. It brings about an oxidation-reduction reaction in which sugar groups present in the sulfite liquor reduce the chromate radical to chromium ion, and the sugars are in turn oxidized to a state in which they are not prone to induce foaming. In the reaction, the sodium chromate is converted to basic chromic sulfate and sugar groups of the lignosulfonic acids become oxidized to organic acid groups. The resulting organic acids combine vigorously with the chromic sulfate to form exceedingly complex chemical compounds, apparently by chelation. The product of the reaction between the chromium salt and lignosulfonic acids is a dispersant which is a substantially iron-free, water-soluble chromium complex of oxidized lignosulfonates.

The effect of magnesium sulfate upon the course of this reaction is unexpected because the properties of the products made by introducing magnesium sulfate before or with the chromium salt are almost the same as the properties of the product made when the magnesium sulfate is added after the chromium reaction is complete. Regardless of the way magnesium enters into this complex reaction, the presence of the magnesium sulfate makes a pronounced difference in ability of the product to control the rheological properties of a well fluid, whether the magnesium sulfate is added before, during, or after the chromium reaction. The presence of 0.5 to 20%, or preferably 1.5 to 2% magnesium sulfate prevents the thickening of well fluids to an undesirable extent when the reaction product is added to such slurries in quantities sufficient to control the filtration properties.

The effect of magnesium sulfate is quite different from that of other sulfates studied, in that sodium sulfate is definitely detrimental to the desired properties in the drilling fluid, and aluminum sulfate is ineffective in preventing the increase in the yield point when water loss reducing quantities of water soluble, oxidized chromium complex lignosulfonate is added to a drilling fluid.

In preparing well fluids of this invention, it is preferred to add the concentrated material described above to a well fluid in which clays are dispersed in water, and hydrated and weighting materials, if required, are dispersed in the clay suspension.

Other materials, if required, are dispersed in the clay suspension. Other materials, such as calcium sulfate, in such quantity as required for forming gypsum muds, or sodium hydroxide and calcium hydroxide for making a lime mud, or sea water and native solids such as are ordinarily used in sea water muds may be present. Addition of the concentrated additives of this invention to such muds in amounts sufficient to furnish 3 to 4 pounds of solids per barrel of mud usually results in a mud having a minimum yield point after about 24 hours aging, but muds prepared in this manner have very high water loss characteristics. It is preferred to add the concentrated additives in quantities to supply from 8 to 15 pounds per barrel (on dry solids basis) of the lignosulfonate material. The lignosulfonate material is a substantially iron-free water soluble chromium complex of oxidized lignosulfonate and the 8 to 15 pound quantity is effective to reduce water loss. Such quantities of the modified lignosulfonate, in excess of the amount of lignosulfonate required to result in minimum yield point of the well fluid, would greatly increase the yield point of the well fluid except for the presence of magnesium sulfate therein.

The magnesium sulfate functions to prevent increase in yield point resulting from excess lignosulfonate complex in a manner which is not clearly understood. This is clearly shown by the fact that when magnesium sulfate and modified lignosulfonate are added separately to the well fluid, the desired result is not obtained. To be effective the magnesium sulfate must be reacted into the lignosulfonate complex while in the liquid state.

When the preferred dry concentrated material containing magnesium sulfate is used, it is preferred that it be poured directly into mud pits and dissolved in the mud in the usual manner by agitating with jets of liquid from submarine guns ordinarily present at the mud pit. However, if desired, the solid concentrate may be dissolved in or mixed with water and added in an aqueous solution or suspension if preferred. The following examples are given to illustrate typical results obtained by use of the processes and materials on this invention:

EXAMPLE I

A concentrated additive was made as described above by adding magnesium sulfate to spent sulfite liquor in quantity equivalent to about 2% of the solids contained in the liquor; sodium dichromate was then dissolved in and thoroughly mixed with the sulfite liquor. The quantity of sodium dichromate used was equivalent to 9% of the solids contained in the liquor. Sulfuric acid was then added in quantity to reduce the pH of the mixture to 1.3 and the mixture was held for two hours. Reaction appeared substantially complete and sodium hydroxide was added in quantity to raise the pH of the mixture to 3.0.

A separate batch of spent sulfite liquor was treated in exactly the same manner except that the magnesium sulfate was omitted.

A gypsum mud was made up by adding 15 pounds of Wyoming bentonite and 31 pounds of Texas bentonite to 42 gallons of water, agitating the mixture and adding 73 pounds of barite and 5 pounds of calcium sulfate

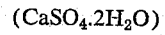
$(CaSO_4.2H_2O)$

Two aliquots of this mud were treated under identical conditions with concentrates made by the two above processes in quantities equivalent to 15 pounds of solids per barrel of mud. The aliquot treated with a product containing no magnesium sulfate had an initial yield point of six, and after aging 24 hours, the yield point had increased to 18, an undesirable figure.

The other aliquot treated with 15 pounds per barrel of modified lignosulfonate containing magnesium sulfate had an initial yield point of −1.0, and after aging 24 hours the yield point was −3.0. This example shows that the well fluid treated with the lignosulfonate containing magnesium sulfate had a decidedly lower yield point when measured initially, and instead of the fluid thickening upon aging, it was thinned further as evidenced by a reduction in the yield point to −3.0. The relatively high concentration of 15 pounds per barrel used in this example is common practice in the field in order to obtain control of filtration properties, which is necessary for deep drilling. The improvement brought about by including magnesium sulfate in the formulation greatly enhances the usefulness of this chemical under actual field conditions.

EXAMPLE II

Another batch of concentrate containing magnesium sulfate was prepared exactly as described in Example I except that the 2% of magnesium sulfate, based on the solid content of the liquor, was added after neutralization of the liquor with sodium hydroxide. Aliquots of the same mud used in Example I were treated with the magnesium sulfate containing concentrate of Example I and with the concentrate in which the magnesium sulfate was added after neutralization. About 3 pounds per barrel of solids contained in each of the two concentrates were found to give approximately minimum yield point of the mud. The aliquots treated with three pounds per barrel of concentrate of Example I containing magnesium sulfate after aging for a period of 24 hours, had an apparent viscosity of 11.5, a yield point of minus 1, and a water loss of 25 cc. The aliquots treated with the material in which the magnesium sulfate was added after the sodium hydroxide had an apparent viscosity of 11.5 with a yield point of minus 3. This mud had a fluid loss of 24.6 after aging for a period of 24 hours.

It will thus be seen that quantities of each additive just sufficient to give the minimum yield point resulted in no particular difference in water loss.

Other aliquots of mud were treated with the same materials in quantities corresponding to 15 pounds per barrel of solids. The mud containing the concentrate in which 2% of magnesium sulfate was added before sodium dichromate had an initial apparent viscosity of 20.5 and a yield point of minus 1, and after aging for a period of 24 hours had an apparent viscosity of 17.5 and a yield point of minus 3. This relatively high level of treatment resulted in a water loss of 11.8 cc. compared to 25 cc. for the 3 pound per barrel treatment.

The mud made using the concentrate in which 2% magnesium sulfate was added after the sodium hydroxide treatment had an initial apparent viscosity of 23 and a yield point of 6, but after aging for a period of 24 hours, the apparent viscosity had decreased to 17 and the yield point to minus 4. The water loss of this sample was 7.0 cc. compared to 24.6 cc. for the 3 pound treatment.

The result of the tests described in Examples I and II shows that the addition of 2% magnesium sulfate in the lignosulfonate complex improves its effectiveness for thinning and stabilizing well fluids. As a result of the improvements obtained, the material of this invention can be used in the relatively high concentrations required under field conditions to obtain control of filtration properties. The examples also show that when the magnesium sulfate is added before the dichromate, the resulting product is slightly more effective in thinning the mud as evidenced by the initial yield point measurements, but it is somewhat less effective when used in high concentrations for lowering the water loss. In the selection of material for actual use in treating well fluids, both thinning and filtration control is important. The examples point out variations that can be obtained by the order of adding the ingredients in formulating the product. To one skilled in the art there are other variations such as time, temperature, and degree of mixing, which have minor effect upon the effectiveness of the material for a given end use. Examples I and II show the improvement that is obtained by the addition of one concentration of magnesium sulfate. It also indicates that either order of adding the magnesium sulfate gives an improved product, and based upon the performance data reported both of the samples containing magnesium sulfate would be satisfactory for commercial usage in well drilling fluids.

*Table No. 1*

EFFECT OF ADDING $MgSO_4 \cdot 7H_2O$ TO MODIFIED LIGNOSULFONATE FORMULA

| Sample added to gyp mud [1] | Lb./bbl. | Before and after aging | A.V. | Y.P. | W.L. |
|---|---|---|---|---|---|
| Original Formula | 3 | Initial | 20 | 8 | |
| | 3 | Final | 14 | 0 | 18.7 |
| | 15 | Initial | 22 | 6 | |
| | 15 | Final | 28 | 18 | 12.1 |
| Formula + 2% $MgSO_4 \cdot 7H_2O$ added before Dichromate. | 3 | Initial | 17 | 2 | |
| | 3 | Final | 11.5 | −1 | 25.0 |
| | 15 | Initial | 20.5 | −1 | |
| | 15 | Final | 17.5 | −3 | 11.8 |
| Formula + 2% $MgSO_4 \cdot 7H_2O$ added after Sodium Hydroxide. | 3 | Initial | 18 | 4 | |
| | 3 | Final | 11.5 | −3 | 24.6 |
| | 15 | Initial | 23 | 6 | |
| | 15 | Final | 17 | −4 | 7.0 |
| Formula + 3% $MgSO_4 \cdot 7H_2O$ added before Dichromate. | 3 | Initial | 16 | 2 | |
| | 3 | Final | 12.5 | −1 | 24.2 |
| | 15 | Initial | 19 | 2 | |
| | 15 | Final | 18 | −8 | 10.0 |
| Formula + 4% $MgSO_4 \cdot 7H_2O$ added before Dichromate. | 3 | Initial | 10 | −6 | |
| | 3 | Final | 10 | −6 | |
| | 15 | Initial | 21.5 | −3 | |
| | 15 | Final | 21.5 | −9 | 14.4 |
| Formula + 20% $MgSO_4 \cdot 7H_2O$ added before Dichromate. | 3 | Initial | 10 | −4 | |
| | 3 | Final | 10 | −6 | |
| | 15 | Initial | 20.5 | −5 | |
| | 15 | Final | 20.0 | −14 | 16.4 |

[1] Gyp mud prepared adding 5 lb./bbl. $CaSO_4 \cdot 2H_2O$ to standard laboratory base treating stock containing Magcogel, Xact Clay and Magcolnar.
Initial data measured after stirring 10 minutes; final data measured after aging 16 hours at 150° F.

Table No. 1 lists the data referred to in Examples I and II. It also shows data on additional batches of concentrate which were made up using 3, 4 and 20% magnesium sulfate. It will be observed that there is some improvement in the ability of the concentrate to thin well fluids as evidenced by lower yield points. There is also evidence that extremely high concentrations of magnesium sulfate even though they are very effective in thinning the well fluids do tend to increase the water loss slightly.

This data shows that magnesium sulfate is effective over a wide range in improving the performance properties of the modified lignosulfonate which is the subject of this invention. The optimum concentration of magnesium sulfate and the order of addition in the formulation of the product will be evident to those skilled in this field depending upon the specific results desired of the finished product.

From the foregoing, it will be seen that this invention is one well adapted to attain all of the ends and objects hereinabove set forth, together with other advantages which are obvious and which are inherent to the process and method.

It will be understood that certain features and subcombinations are of utility and may be employed without reference to other features and subcombinations. This is contemplated by and is within the scope of the claims.

The invention having been described, what is claimed is:

1. An additive for controlling the rheological properties of a well fluid comprising a reaction product of magnesium sulfate and a modified lignosulfonate made by adding an alkali metal dichromate to spent sulfite liquor in proportion equivalent to about 5 percent to 12 percent of the weight of solids initially contained in said liquor, mixing the chromium salt and liquor, then mixing therewith a material selected from the group consisting of sulfuric, hydrochloric and nitric acids and mixtures thereof in quantity sufficient to reduce the pH of the mixture to a value not more than 2.0, holding the resulting mixture until reaction between the chromium salt and lignosulfonate is substantially complete, adding a material selected from the group consisting of sodium, potassium and lithium hydroxides in quantity sufficient to raise the pH of the mixture to a point within the range from 2.5 to 4.0; said magnesium sulfate being introduced into the mixture in amount equivalent to 0.5 to 20 percent of the weight of solids initially contained in said spent sulfite liquor.

2. An additive for controlling the rheological properties of well fluid which comprises a reaction product of magnesium sulfate and a modified lignosulfonate made by adding sodium dichromate to spent sulfite liquor in proportion equivalent to about 5 percent to 12 percent of the total weight of solids in said liquor, mixing and dissolving the sodium dichromate in the liquor, then adding sufficient sulfuric acid thereto to lower the pH of the resulting mixture to a value not more than 2.0, holding the mixture until reaction between the dichromate and lignosulfonate is substantially complete, adding caustic soda in quantity sufficient to raise the pH of the mixture to about 3.5; said magnesium sulfate being introduced into the mixture in quantity equivalent to about 1.5 to 2.0 percent of the weight of the solids contained in said spent sulfite liquor.

3. A dry free-flowing additive for controlling rheological properties of a well fluid which consists essentially of a reaction product of magnesium sulfate and a modified lignosulfonate made by adding sodium dichromate to spent sulfite liquor in proportion equivalent to about 5 percent to 12 percent of the total weight of solids contained in said liquor; dissolving and mixing the sodium dichromate in the liquor; then adding sulfuric acid thereto in quantity to lower the pH of the resulting mixture to a value not more than 2.0; holding the mixture until reaction between the dichromate and lignosulfonate is substantially complete, adding a material selected from the group consisting of sodium, potassium and lithium hydroxides in quantity sufficient to raise the pH of the mixture to a point within the range of 3.0 to 4.5, said magnesium sulfate being introduced into the mixture in proportion equivalent to 0.5 to 20 percent of the weight of solids contained in said spent sulfite liquor; and drying the resulting mixture.

4. A dry free-flowing additive for controlling the rheological properties of a well fluid which consists essentially of a product made by adding sodium dichromate to spent sulfite liquor in quantity equivalent to about 9 percent of the weight of solids contained in said liquor, dissolving and mixing the sodium dichromate in the liquor, then mixing therewith sulfuric acid in quantity to reduce the pH of the mixture to a value not greater than 2.0, holding the resulting mixture until the reaction between the dichromate and lignosulfonate is substantially complete, adding sodium hydroxide in quantity to raise the pH of the mixture to a point within the range from 3.0 to 4.5, adding magnesium sulfate to the reaction mixture in quantity equivalent to 1.5 to 2.0 percent of the weight of solids in spent sulfite liquor, and drying the resulting mixture.

5. A dry free-flowing additive for controlling the rheological properties of a well fluid which consists essentially of a product made by adding magnesium sulfate to spent sulfite liquor in quantity equivalent to about 1.5 to 2.0 percent of the weight of solids in said spent sulfite liquor, adding sodium dichromate to the resulting mixture in quantity equivalent to about 9 percent of the weight of solids initially contained in the spent sulfite liquor, then mixing therewith sulfuric acid in quantity to reduce the pH of the mixture to about 1.3, holding the resulting mixture until reaction is substantially complete, and adding sodium hydroxide in quantity to raise the pH of the mixture to a point within the range of 2.5 to 4.0, and drying the resulting mixture.

6. A well fluid comprising an aqueous suspension of clay containing a yield point and fluid-loss reducing amount of a modified lignosulfonate, said modified lignosulfonate being made by adding a water soluble chromium salt of an alkali metal to spent sulfite liquor in proportion equivalent to about 5 percent to 12 percent of the weight of solids initially contained in the liquor, dissolving and mixing the chromium salt in the liquor and then mixing therewith a material selected from the group consisting of sulfuric, hydrochloric and nitric acids and mixtures thereof in quantity to reduce the pH of the mixture to not more than 2.0, holding the resulting mixture until reaction between the chromium salt and lignosulfonate is substantially complete; adding material selected from the group consisting of sodium, potassium and lithium hydroxides in quantity sufficient to raise the pH of the mixture to at least 2.5 and introducing magnesium sulfate into the reaction mixture in quantity equivalent to 0.5 to 20 percent of the weight of solids initially contained in the spent sulfite liquor before, during or after said reaction.

7. The well fluid of claim 6 wherein the amount of magnesium sulfate is about 1.5 to 2.0 percent of the weight of solids contained in said spent sulfite liquor.

8. A process for preparing a well fluid additive which comprises adding an alkali metal dichromate to spent sulfite liquor in proportion equivalent to about 5 percent to 12 percent of the total weight of solids contained in said liquor, dissolving and mixing the chromium salt in the liquor, then adding sufficient sulfuric acid to lower the pH of the resulting mixture to a value not more than 2.0, holding the mixture until reaction is substantially complete, adding a material selected from the group consisting of sodium, potassium and lithium hydroxides in quantity sufficient to raise the pH of the mixture to about 3.5, introducing magnesium sulfate into the reaction mixture in proportion equivalent to from 0.5 to 20 percent of the weight of solids contained in said spent sulfite liquor, and drying the resulting mixture.

9. The process of claim 8 wherein the magnesium sulfate is introduced into the spent sulfite liquor prior to adding the soluble chromium salt thereto.

10. The process of claim 8 wherein the magnesium sulfate is introduced into the reaction mixture after said reaction is substantially complete.

References Cited in the file of this patent

UNITED STATES PATENTS

| | | |
|---|---|---|
| 1,155,256 | Marchand | Sept. 28, 1915 |
| 2,822,358 | Hearon et al. | Feb. 4, 1958 |
| 2,856,356 | Weiss et al. | Oct. 14, 1958 |
| 2,858,271 | Byrd | Oct. 29, 1958 |
| 2,935,473 | King et al. | May 3, 1960 |
| 2,935,504 | King et al. | May 3, 1960 |

FOREIGN PATENTS

| | | |
|---|---|---|
| 43,298 | Norway | Oct. 25, 1926 |